United States Patent
Lapp et al.

(10) Patent No.: US 9,243,709 B2
(45) Date of Patent: Jan. 26, 2016

(54) WELDED PISTON ASSEMBLY

(71) Applicant: Mahle International GmbH, Stuttgart (DE)

(72) Inventors: Michael T. Lapp, Bloomfield, MI (US); Alex Antoc, Sterling Heights, MI (US); Luiz Perrone, Ann Arbor, MI (US); Dietmar Spindler, Niles, MI (US)

(73) Assignee: Mahle International GmbH (DE)

( * ) Notice: Subject to any disclaimer, the term of this patent is extended or adjusted under 35 U.S.C. 154(b) by 372 days.

(21) Appl. No.: 13/830,713

(22) Filed: Mar. 14, 2013

(65) Prior Publication Data

US 2014/0260960 A1    Sep. 18, 2014

(51) Int. Cl.
*F16J 1/00* (2006.01)
*B23P 15/10* (2006.01)
*F02F 3/00* (2006.01)

(52) U.S. Cl.
CPC ............... *F16J 1/005* (2013.01); *B23P 15/10* (2013.01); *F02F 3/003* (2013.01); *F02F 2003/0061* (2013.01); *Y10T 29/49826* (2015.01)

(58) Field of Classification Search
CPC ............................... F02F 3/0015; F02F 3/003
USPC ........................................ 92/231; 29/888.042
See application file for complete search history.

(56) References Cited

U.S. PATENT DOCUMENTS

| 6,260,472 B1 | 7/2001 | Zhu et al. |
| 7,415,959 B2 | 8/2008 | Scharp |
| 2011/0107997 A1 | 5/2011 | Muscas et al. |
| 2012/0037111 A1 * | 2/2012 | Scharp et al. ............ 29/888.042 |
| 2012/0037115 A1 * | 2/2012 | Schnaiter et al. ........ 29/888.044 |
| 2012/0145112 A1 | 6/2012 | Scharp |
| 2012/0222645 A1 * | 9/2012 | Edel et al. ................ 29/888.042 |

FOREIGN PATENT DOCUMENTS

| DE | 3032671 A1 | 3/1982 | |
| DE | 102008035697 A1 * | 2/2010 | ............... F02F 3/00 |
| WO | WO-2013167105 A1 | 11/2013 | |

OTHER PUBLICATIONS

International Search Report for PCT/US2014/024514 mailed Aug. 12, 2014.
Bibliographic Data Sheet indicating No Abstract Available for DE3032671.
English Abstract for WO2013167105A1.

\* cited by examiner

*Primary Examiner* — Thomas E Lazo
(74) *Attorney, Agent, or Firm* — Fishman Stewart Yamaguchi PLLC

(57) ABSTRACT

A pre-finished piston part is disclosed that may be used to form a piston assembly. A pre-finished piston may include a lower part defining a piston axis, the lower part having a skirt and forming a lower surface of a cooling gallery. The lower part may include a radially inner bowl surface defining a lower part radially inner mating surface. The pre-finished piston assembly may further include an upper part having a radially outer bowl surface meeting the radially inner bowl surface at a radially inner joint. The upper part may include a radially inner wall defining a radially inner upper part mating surface. The radially inner wall may define a radially inwardly facing surface that defines a non-parallel angle with the radially inner bowl surface where the radially inner bowl surface meets the radially innermost edge of the radially inner mating surface.

23 Claims, 7 Drawing Sheets

US 9,243,709 B2

WELDED PISTON ASSEMBLY

BACKGROUND

Internal combustion engine manufacturers are constantly seeking to increase power output and fuel efficiency of their products. One approach to generally increasing efficiency and power is to reduce the oscillating mass of an internal combustion engine, e.g., of the pistons, connecting rods, and other moving parts of the engine. Engine power may also be increased by raising the compression ratio of the engine. Raising the compression ratio of an engine also generally raises the pressure and temperature within the combustion chamber during operation.

As a result of the weight reductions in combination with increased pressures and temperatures associated with operation, engines, and in particular the pistons of the engine, are under increased stress. Piston cooling is therefore increasingly important for withstanding the increased stress of such operational conditions over the life of the engine.

To reduce the operating temperatures of piston components, a cooling gallery may be provided about a perimeter of the piston. A coolant such as crankcase oil may be introduced to the cooling gallery, and may be distributed about the cooling gallery by the reciprocating motion of the piston, thereby reducing the operating temperature of the piston.

At the same time, the cooling galleries may increase overall complexity of the piston assembly and manufacturing of the same. For example, cooling galleries may require additional component, such as a cooling gallery cover, to encourage proper circulation of a coolant throughout the cooling gallery by temporarily retaining coolant (e.g., oil) that is circulated through the cooling gallery. The additional components such as cover plates also add complexity, however. Additionally, cooling galleries may be expensive and/or difficult to form in smaller piston applications such as in the case of lightweight or light duty pistons.

Accordingly, there is a need for a piston that is practical for production in a mass manufacturing environment, while also allowing adequate cooling, such as by providing a cooling gallery.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein of a pre-finished piston part that may be used to form a piston assembly. A pre-finished piston may include a lower part defining a piston axis, the lower part having a skirt and forming a lower surface of a cooling gallery. The lower part may include a radially inner bowl surface defining a lower part radially inner mating surface, and a radially outer wall defining a radially outer mating surface. The pre-finished piston assembly may further include an upper part having a radially outer bowl surface meeting the radially inner bowl surface at a radially inner joint. The upper part may include a radially inner wall defining a radially inner upper part mating surface, and a radially outer wall defining an upper part radially outer mating surface. The radially inner wall may define a radially inwardly facing surface that defines a non-parallel angle with the radially inner bowl surface where the radially inner bowl surface meets the radially innermost edge of the radially inner mating surface.

Exemplary methods may include a method of forming a pre-finished piston assembly. An exemplary method may include providing a lower part defining a piston axis, the lower part having a skirt and forming a lower surface of a cooling gallery, the lower part having a radially inner bowl surface defining a lower part radially inner mating surface, the lower part including a radially outer wall defining a radially outer mating surface. The method may further include abutting the lower part against an upper part, the upper part having a radially outer bowl surface meeting the radially inner bowl surface at a radially inner joint, the upper part including a radially inner wall defining a lower surface extending radially to define an upper part radially inner mating surface, the upper part including a radially outer wall defining an upper part radially outer mating surface. The method may further include welding the radially inner mating surfaces together, wherein a radially inwardly facing surface of the upper part defines a non-parallel angle with the radially inner bowl surface where the radially inner bowl surface meets the radially innermost edge of the radially inner mating surface.

Figure 1A:
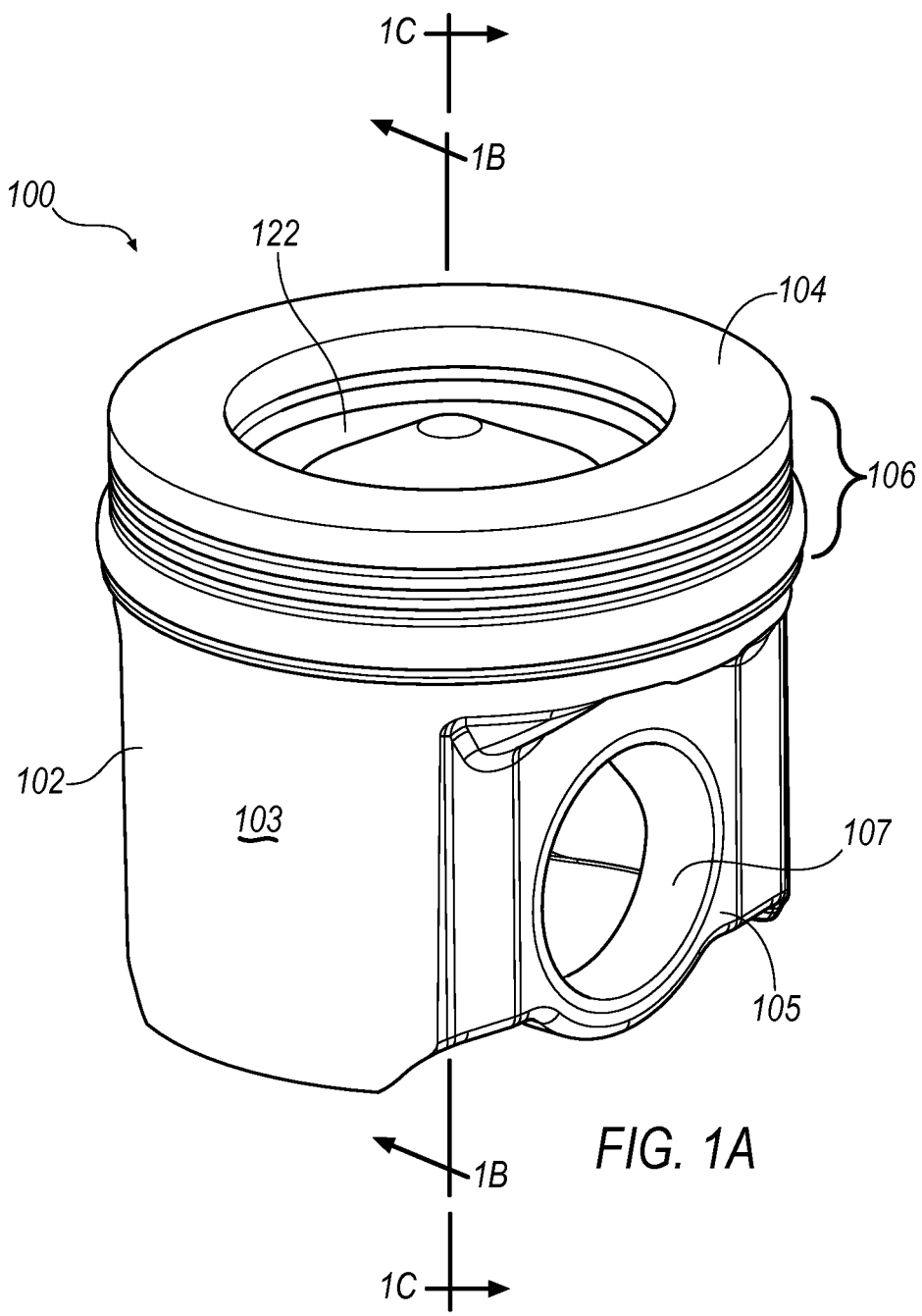
FIG. 1A is a perspective view of an exemplary piston assembly.
Figure 1B:
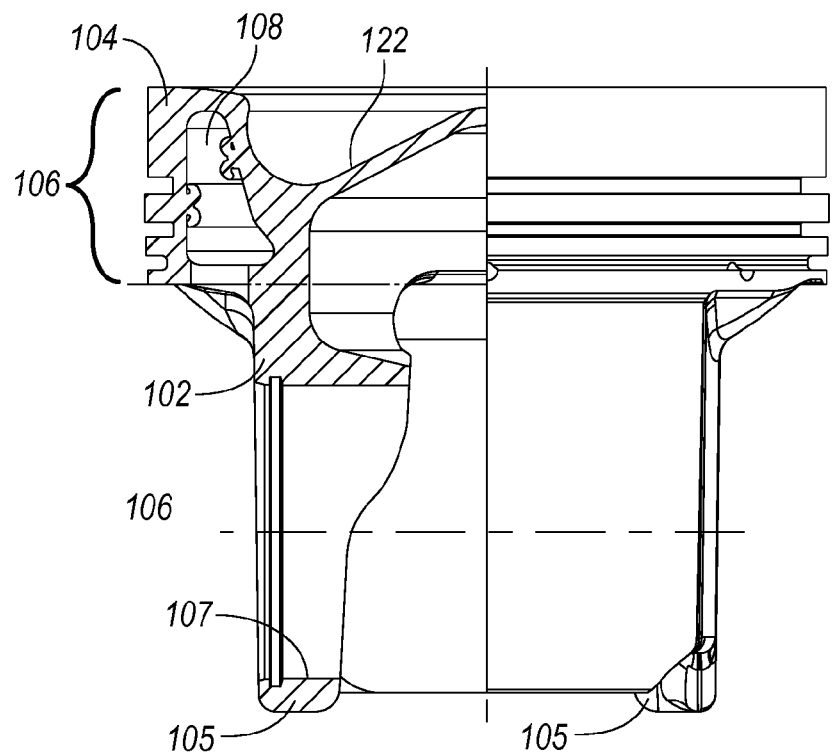
FIG. 1B is a partial section view of the exemplary piston assembly of FIG. 1A.
Figure 1C:
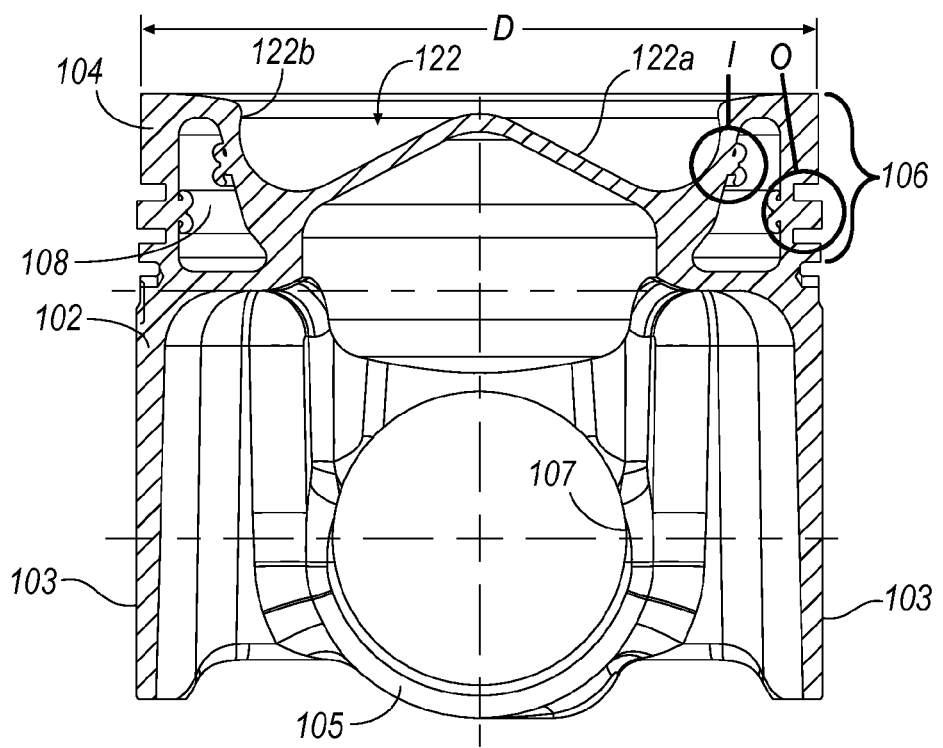
FIG. 1C is a section view of the exemplary piston assembly of FIG. 1A, taken at ninety degrees with respect to the section of FIG. 1B.

Turning now to FIGS. 1A, 1B, and 1C, an exemplary piston assembly 100 is illustrated. Piston assembly 100 may include a piston body 102 and a cooling gallery ring 104 that is joined with the body 102. The piston body 102 and cooling gallery ring 104 may cooperate to define a combustion bowl 122. The body 102 may include a ring belt portion 106 that is configured to seal against an engine bore (not shown) receiving the piston assembly 100. For example, the ring belt portion 106 may define one or more circumferential grooves that receive piston rings (not shown), which in turn seal against engine bore surfaces during reciprocal motion of the piston assembly 100 within the engine bore. The cooperation of the cooling gallery ring 104 and body 102 in defining the combustion bowl 122, as well as other features of the piston 100 described below, may generally allow flexibility in regard to the size and shape of the piston 100 and components thereof, e.g., cooling gallery ring 104 and/or the piston body 102. Merely as one example, a lower overall compression height and/or center of gravity of the piston assembly 100 may be achieved as a result of the configuration of a radially inner joint between the cooling gallery ring 104 and body 102 during an associated forming process, as will be described further below.

The piston body 102 may include a skirt surface 103 that generally supports the piston assembly 100 during engine operation, e.g., by interfacing with surfaces of an engine bore (not shown) to stabilize the piston assembly 100 during reciprocal motion within the bore. For example, the skirt surface 103 may generally define a circular outer shape about at least a portion of a perimeter of the piston assembly 100. The outer shape may correspond to the engine bore surfaces, which may be generally cylindrical.

The body 102 may also define piston pin bosses 105. The piston pin bosses 105 may generally be formed with apertures 107 configured to receive a piston pin (not shown). For example, a piston pin may be inserted through the apertures in the piston pin bosses 105, thereby generally securing the piston 100 to a connecting rod (not shown).

Turning now to FIGS. 1B and 1C, the body 102 and cooling gallery ring 104 may cooperate to define a cooling gallery 108. The cooling gallery 108 generally extends about a perimeter of the piston crown, and may circulate a coolant during operation, e.g., engine oil, thereby reducing an operating temperature of the piston. Additionally, the circulation of the coolant may facilitate the maintaining of a more stable or uniform temperature about the piston 100, and especially in the upper portion of the piston assembly 100, e.g., adjacent the combustion bowl 122.

The piston body 102 and ring 104 may be fixedly joined, e.g., in a welding process. By fixedly joining the piston body 102 and ring 104, the piston assembly 100 is generally formed as a one-piece or "monobloc" assembly. As will be described further below, the body 102 and ring 104 components may be joined along both radially inner and outer interface regions I, O in a welding process. Accordingly, the piston body 102 may be generally unitized with the cooling gallery ring 104, such that each is immovable relative to the other after securement to the crown, although the body 102 and ring 104 are separate components.

The cooling gallery ring 104 may be secured to the body 102 such that the crown 102 and the skirt 104 cooperate to form a generally continuous upper combustion bowl surface 122 of the piston assembly 100. For example, as will be described further below, corresponding mating surfaces of the body 102 and cooling gallery ring 104 may meet within the combustion bowl 122 along a radially inner interface region I such that the piston body 102 defines a radially inner portion 122a of the combustion bowl 122, while the cooling gallery ring 104 defines a radially outer portion 122b of the combustion bowl 122. The radially outer interface region O may be positioned along the ring belt portion 106.

The piston body 102 and the cooling gallery ring 104 may be secured or fixedly joined to one another in any manner that is convenient including, but not limited to, welding methodologies such as friction welding, beam welding, laser welding, soldering, or non-welding methodologies such as adhesive bonding, merely as examples. In one example, the piston crown and skirt are joined in a welding process, e.g., friction welding. In another exemplary illustration, respective mating surfaces of a lower piston part corresponding to piston body 102, and of an upper piston part corresponding to cooling gallery ring 104, may be joined in a friction welding process or adhesive bonding process, merely as examples, thereby securing the piston body 102 and cooling gallery ring 104 together.

Figure 2A:
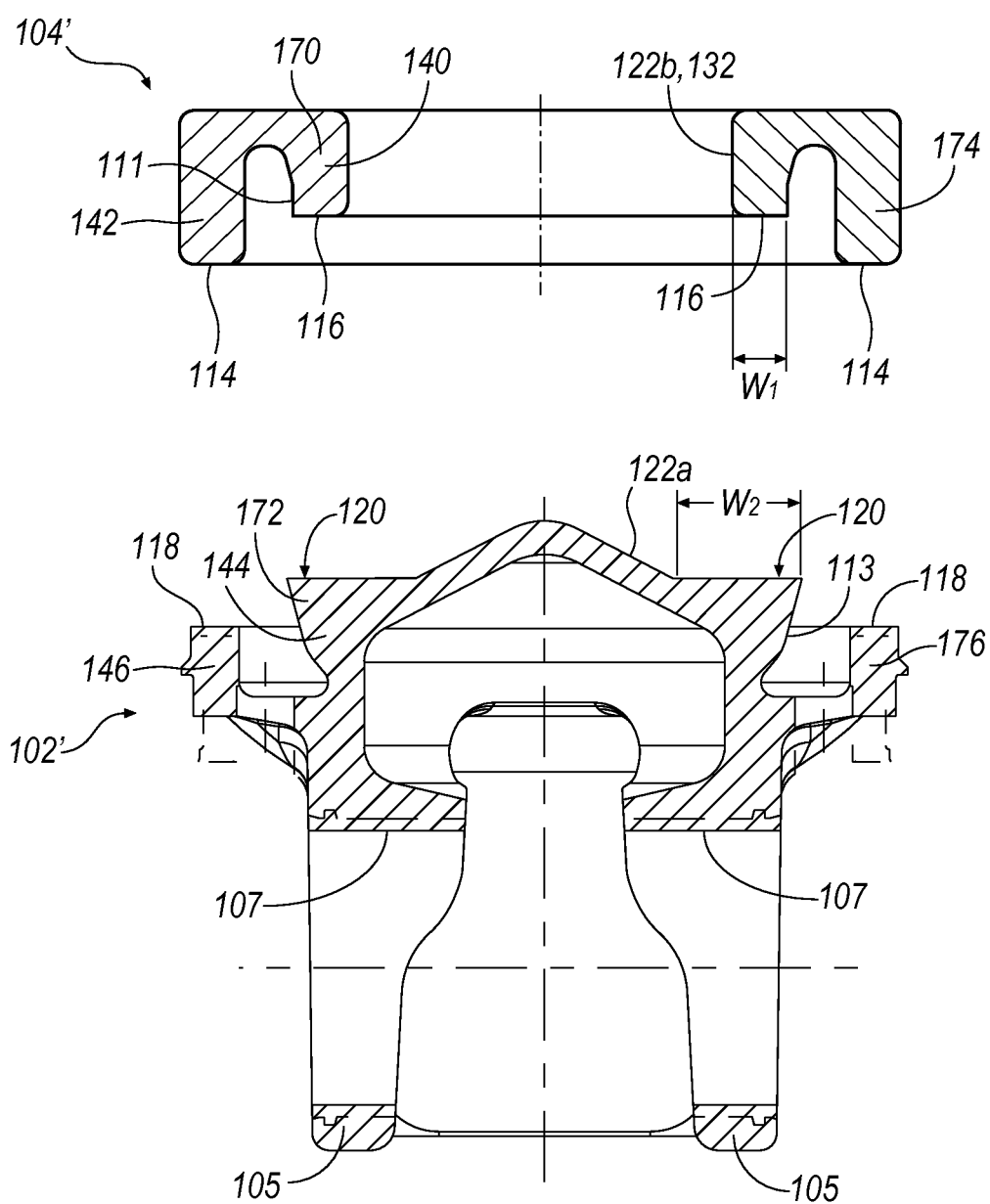
FIG. 2A is a partial section view of an exemplary piston upper part and piston lower part.
Figure 2B:
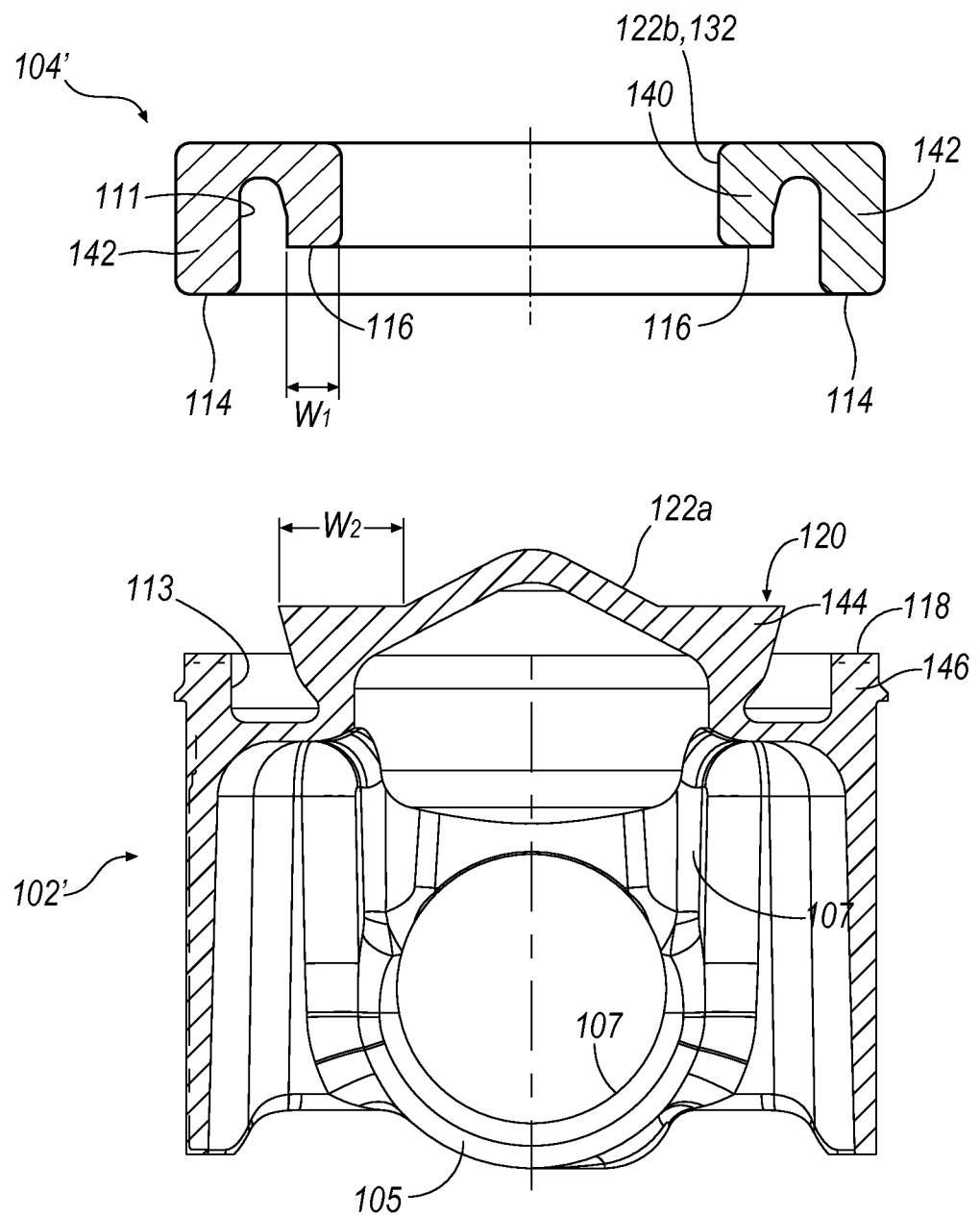
FIG. 2B is a partial section view of an exemplary piston upper part and piston lower part, taken at ninety degrees with respect to the section of FIG. 1B.

Turning now to FIGS. 2A, and 2B, an exemplary friction welding process associated with piston 100 is explained in further detail. Piston 100 may generally be formed from an upper piston part 104' corresponding to cooling gallery ring 104, and a lower piston part 102' corresponding to piston body 102. For example, the upper and lower piston parts 104', 102' may generally have the features shown corresponding to the piston 100, e.g., upper and lower interior surfaces 111, 113 corresponding to the cooling gallery 108. Moreover, the upper and lower piston parts 104', 102' may generally be suitable for joining to each other, e.g., via a friction welding process, while they may not have finished external surfaces or features of the piston 100 such as the ring grooves, combustion bowl 122, etc. seen above in piston assembly 100.

Accordingly, the upper and lower piston parts 104', 102' may generally be joined together, e.g., in a friction welding operation, to form a pre-finished piston component 100' as will be described further below, and as best seen in FIGS. 3A, 3B, 4A, 4B, and 5. The pre-finished piston component may subsequently be finished, e.g., in a machining operation, to provide finished surface details required for the piston 100, e.g., ring grooves and the final shape or contour of the combustion bowl 122. Accordingly, the general shape of the final piston assembly 100 is illustrated in phantom in FIGS. 4A, 4B, and 5, in contrast to the initial shape defined by the pre-finished piston part 100'.

As best seen in FIGS. 2A and 2B, mating surfaces 114, 116 of the upper piston part 104' may be secured to respective mating surfaces 118, 120 of the lower piston part 102' in any manner that is convenient, e.g., by way of a welding operation such as friction welding or adhesive bonding, merely as examples, thereby securing the upper piston part 104' and the lower piston part 102' together. Piston parts 102', 104' are illustrated in further detail in FIGS. 3A, 3B, 4A, 4B, and 5 after an exemplary friction welding process.

Figure 3A:
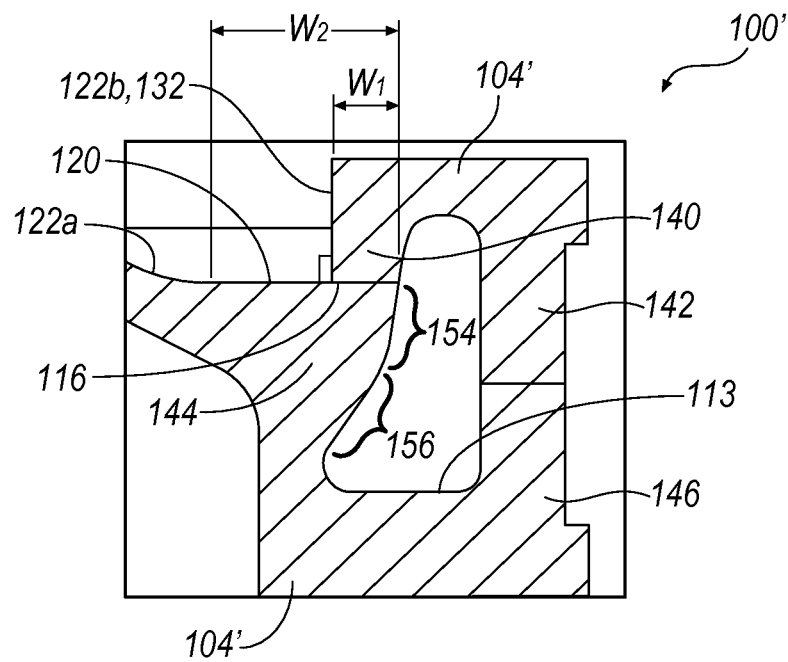
FIG. 3A is an enlarged section view of a cooling gallery area of a piston upper part and lower part.
Figure 3B:
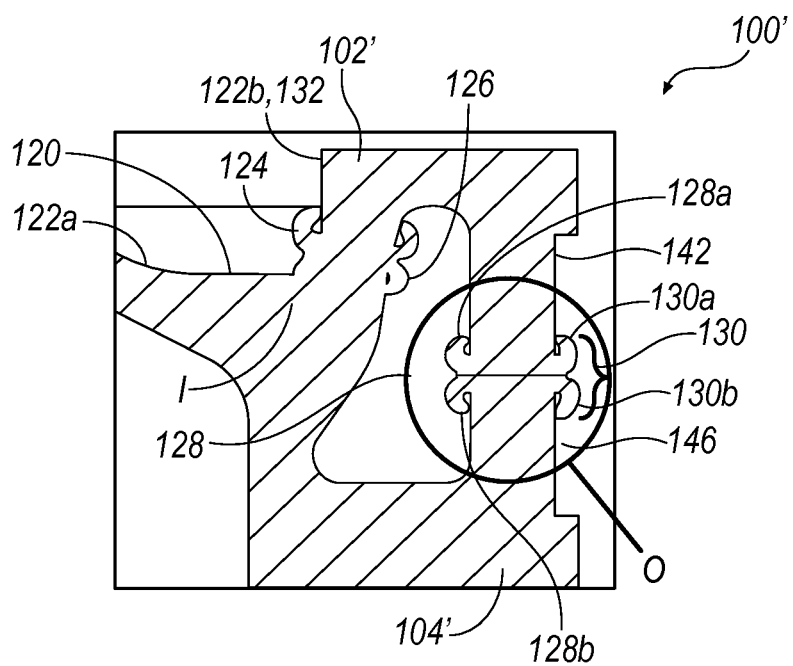
FIG. 3B is an enlarged section view of a cooling gallery area of the piston upper part and lower part of FIG. 3A, after an exemplary welding process.
Figure 4A:
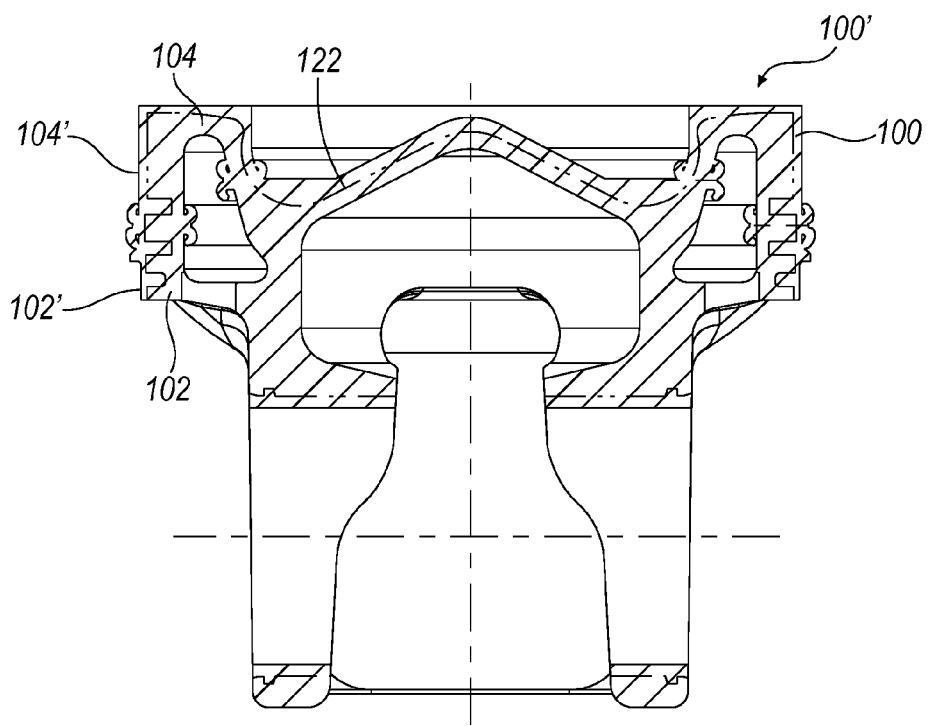
FIG. 4A is a section view of an exemplary piston upper part and lower part after an exemplary welding process.
Figure 4B:
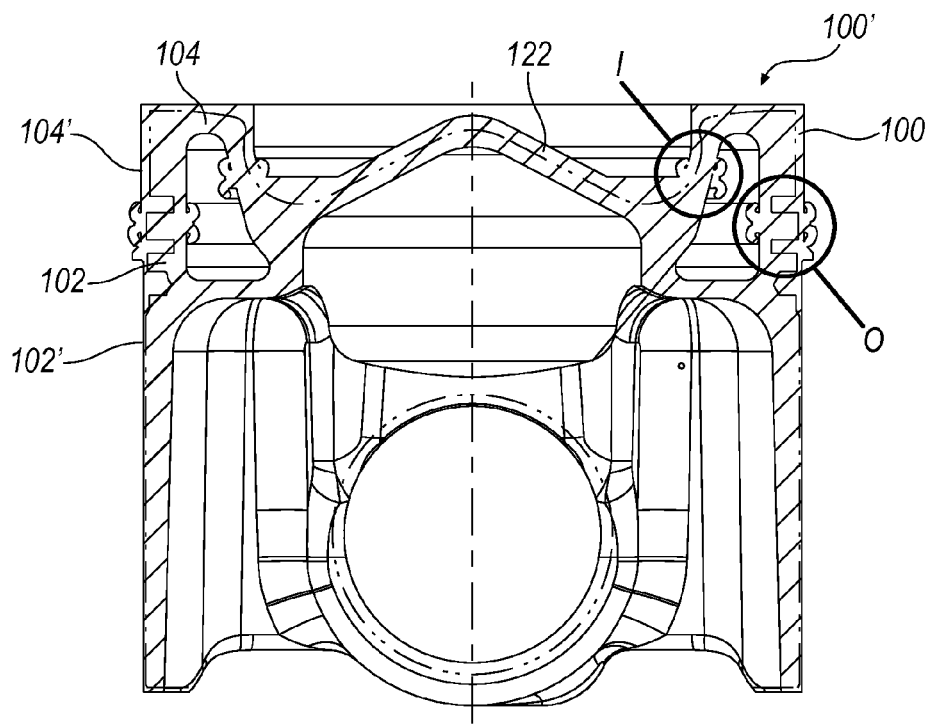
FIG. 4B is a section view of an exemplary piston upper part and lower part after an exemplary welding process, taken at ninety degrees with respect to the section of FIG. 4A.

The upper part 104' and lower part 102' may initially be rotated at high speed relative to one another, and then placed together under high pressure as illustrated in FIG. 3A. Such a friction welding process may form weld curls 124, 126, 128, and 130 between the upper piston part 104' and lower piston part 102', as best seen in FIGS. 3B, 4A, and 4B. More specifically, weld curls 124, 126 may be formed that extend radially inwardly and outwardly, respectively, from the radially inner interface region I. Additionally, weld curls 128, 130 may be formed that extend radially inwardly and outwardly, respectively, from the radially outer interface region O.

As best seen in FIGS. 3B, 4A, 4B, 5A, and 5B, the weld curl 124 extending radially inwardly from the radially inner interface region I may generally form a single curl 124 extending radially inwardly and upwardly from the mating surfaces 118, 120 of the piston upper and lower parts 104', 102'. By contrast, the weld curls 126, 128, and 130 each include respective upper and lower curl portions. More specifically, as best seen in FIG. 3B, weld curl 128 includes an upper curl 128a and a lower curl 128b, and weld curl 130 includes an upper curl 130a and lower curl 130b. Typically, during a friction welding process, an upper and lower curl, e.g., upper curl 128a and lower curl 128b, may generally form in equal measure and shape from material of the associated mating surfaces, e.g., mating surfaces 114, 116. The generally equal weld curl portions 128a, 128b, 130a, 130b may result in part from the generally equal radial widths of the associated mating surfaces 114, 116, and the alignment of the mating surfaces 114, 116 substantially perpendicular to the piston axis (not shown in FIG. 3B).

By contrast, the generally single, upwardly extending weld curl 124 may result in part from a difference in widths $W_1$, $W_2$ between the associated mating surfaces 116, 120, respectively, along the radially inner interface region I. The mating surfaces 116, 120 may be defined by corresponding wall members 170, 172 of the piston upper part 104' and piston lower part 102', respectively. Additionally, the mating surfaces 114, 118 may be defined by corresponding wall members 174, 176 of the piston upper part 104' and piston lower part 102', respectively. More specifically, while the weld curl 126 extending radially outwardly from the mating surfaces 118, 120 may form into two distinct upper and lower curl portions 126a, 126b in a similar fashion as the weld curls 128, 130, the weld curl 124 generally includes a single curl which extends upwardly and radially inwardly from the associated mating surfaces 118, 120. The weld curl 124 may form into a single curl portion 124a as a result of welded material from the mating surfaces 118, 120 being forced to flow upwards by the radially inwardly extending mating surface 120. More specifically, as material from the mating surfaces 118, 120 melts during the friction welding process, material forming the weld curl 124 is forced to flow upwardly and cannot curl downward due to the radially inwardly extending mating surface 120. Thus, material forming the weld curl 124 is forced to flow upwards and radially inwardly from the mating surface 118 forming the single weld curl 124.

In another exemplary illustration, as best seen in FIG. 3A the mating surface 120 extends radially inwardly from the radially inner interface region I. More specifically, the mating surface 120 may extend radially inwardly from a radially innermost edge of the mating surface 118 of the upper part 104. The radially inwardly extending mating surface 120 may generally force material flow from the welded joint to flow upwards, resulting in a single weld curl 124 extending radially inwardly from the radially inner interface region I. Moreover, the mating surface 120 may extend generally perpendicular to a radially inner surface 132 defined by the radially inner wall portion 140 of the piston upper part 104', as best seen in FIGS. 3A and 3B.

Figure 5:
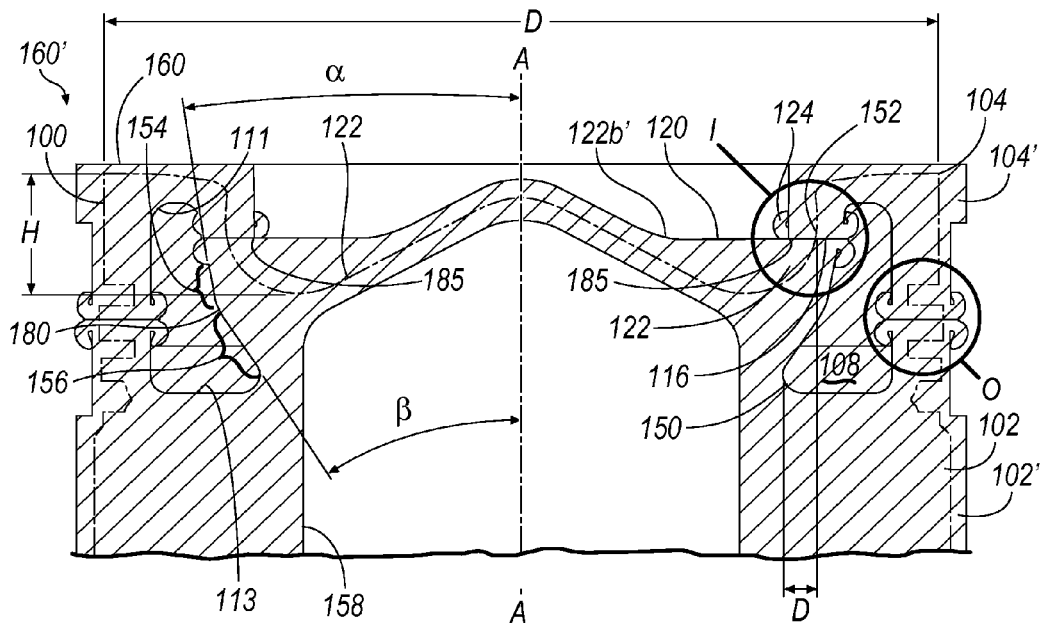
FIG. 5 is a section view of an exemplary piston upper part and lower part after an exemplary welding process.

Turning now to FIGS. 5A and 5B, which is an enlarged view of the upper portion of the exemplary piston 100 and pre-finished piston assembly 100', the shallow bowl construction is illustrated in further detail. As noted above, the outer contour shown in the FIG. 5 indicates the contour of the pre-finished piston assembly 100', prior to any finishing operations, e.g., machining, used to form the final configuration of the piston assembly 100, which is illustrated in phantom lines. Due to the mismatched widths of the radially inner mating surfaces 118, 120, i.e., as a result of the radially inward mating surface 120 extending away from the interface region I, a single weld curl 124 is formed that generally curls upwardly and radially inwardly from the radially inner interface region I, as briefly described above.

Moreover, as seen in FIG. 5, the cooling gallery 108 generally extends radially inwardly with respect to a radially outermost point 152 along the combustion bowl 122 of the final configuration of the piston assembly 100. In other words, a radially innermost point 150 of the cooling gallery 108 is spaced radially inwardly from a radially outermost point 152 of the combustion bowl 122 of the piston assembly 100 by a radial distance D. The enlarged cooling gallery 108 thereby provides enhanced cooling to the piston 100.

The radially inward spacing D between the points 150, 152 may be facilitated at least in part by the illustrated geometry of the lower cooling gallery surface 113 and orientation of the radially inner interface region I. More specifically, as seen in FIG. 5 an uppermost region 154 of the cooling gallery surface 113 of the lower part 102' extends axially downward at an initial angle α with respect to an axis A-A of the piston 100. As illustrated in FIG. 5, the uppermost region 154 may define a linear or substantially linear path leading directly from the mating surface 120 downward with respect to the pre-finished piston 100' at the angle α. The cooling gallery surface 113 may transition to a second angle β with respect to the piston axis A-A, transitioning to the second angle β at an apex 180. More specifically, a second region 156 of the cooling gallery surface 113 may define a linear or substantially linear path from the apex 180 downward with respect to the pre-finished piston 100' at the angle β. The apex 180 may have an axial height with respect to the pre-finished piston 100' corresponding approximately to the axial position of the outer mating surfaces 114, 118, e.g., as seen in FIG. 5. The angle β may be greater with respect to the piston axis A-A than the initial angle α. In one exemplary illustration, the angle α is no greater than twenty (20) degrees, while the angle β is larger than angle β but is no larger than approximately forty-five (45) degrees.

By contrast, in previous friction welding approaches for pistons, surfaces of wall members adjacent mating surfaces of the upper and lower parts used to form the piston typically extend in a substantially parallel fashion above and below mating surfaces, due to the generally large magnitude forces that act upon the mating surfaces and the need to support the mating surfaces to a maximum extent possible. However, the walls extending parallel above and below the joint generally also increases an overall height of the upper piston part, resulting in a greater compression height of the piston overall. Additionally, previous friction welding approaches in pistons have generally required that components be rotationally symmetrical in order to allow joining the cylindrical parts by rotation at high speeds. By comparison, the varied widths $W_1$, $W_2$ of the mating surfaces 116, 120, respectively may be employed herein, resulting in the formation of a single weld curl 124 that may be subsequently removed, as further described below.

Referring again to the exemplary pre-finished piston part 100' and associated piston 100, the exemplary angles α and β have been found to generally provide sufficient support to the mating surfaces 116, 120 of the radially inner interface region I while allowing increased overall volume of the cooling gallery 108 and also a shorter overall height of the upper piston part 104'. The shorter overall height may generally result from the ability to position the radially inner mating surfaces 116, 120 axially higher with respect to a top surface 160 of the piston 100, since the mating surface 120 extends radially inward from the interface region I between the mating surfaces 116, 120, and not parallel to the piston axis as in previous piston welding approaches. Moreover, the radially inwardly extending mating surface 120 increases support to the radially inner interface region I, thereby inhibiting any deformation of the piston upper part 104' or piston lower part 102' that might otherwise result from an imbalance in force application between the mating surfaces 116, 120 resulting from the angled surfaces 154, 156. Accordingly, the wall member 172 of the lower piston part 102' may generally define non-parallel surfaces extending away from the joint between the radially inner mating surfaces 116, 120. By contrast, the wall members 174, 176 meeting in the radially outer interface region O may each generally extend in similar parallel fashion with respect to the piston axis adjacent the joint between the mating surfaces 114, 118, resulting in weld curls 128a, 128b, 130a, and 130b that are substantially equal in magnitude and are generally mirror images of the weld curls of the corresponding piston part.

In another exemplary illustration, the radially inwardly facing surface 132 of the upper part 104' may define a non-parallel angle with a radially inner bowl surface 122b' defined by the lower part 102', which corresponds to the combustion bowl surface contour 122 apart from the lack of finishing the combustion bowl surface 122, e.g., in a machining operation. More specifically, the radially inner bowl surface 122b' may extend to meet a radially innermost edge 185 of the radially inner mating surface 116, at which point the radially inner bowl surface 122b' defines a non-parallel angle with the radially inwardly facing surface 132 of the upper part 104'. Moreover, in some exemplary approaches the radially inner bowl surface 122b' defines a right angle with the radially inwardly facing surface 132 of the upper part 104', or substantially a right angle with the radially inwardly facing surface 132 of the upper part 104'.

The shorter overall height of the piston upper part 104' reduces a compression height of the piston, which is defined here as a ratio between (a) the distance from a top surface of the piston and a pin bore axis (not shown in FIG. 5) and (b) the piston diameter D. Moreover, the reduced overall height of the piston upper part 104' results in a smaller height H of the combustion bowl 122 of the finished piston 100. In one exemplary illustration, the height H of the combustion bowl 122, as measured from upper surface 160 of the piston to a lowermost position of the combustion bowl 122, is no greater than 15% of the piston diameter D. Accordingly, the angled construction of the lower cooling gallery surface 113 adjacent the mating surfaces 116, 120, as well as the radially inwardly extending mating surface 120 facilitate a combustion bowl 122 that is relatively shallow in comparison to previous approaches, while also facilitating a reduced overall compression height of the piston 100.

Upon completion of a friction welding process, weld flashing, e.g., weld curls 124 and 130, may subsequently be removed from outer surfaces of the piston upper part 104' and piston lower part 102' to form the relatively smooth outer surface of the piston assembly 100. For example, weld flashing may be removed via a machining operation. Accordingly, the combustion bowl surface 122 may be substantially smooth across an interface between the cooling gallery ring 104 and the piston body 102, e.g., so that disruptions and/or discontinuities in the surface 122 are minimized. Moreover, the ring belt portion 106 may also be machined or otherwise worked to remove the weld curl 130 and form the ring grooves. Minimizing such disruptions or discontinuities may generally reduce cracks or other loosening of an interface between the body 102 and the ring 104 along the interface regions I, O during normal long-term operation. Accordingly, any defects or failure in the combustion bowl surface 122 and/or ring belt portion 106, e.g., due to wear occurring during operation of an engine using piston assembly 100, may be minimized.

Cooling gallery 108 may advantageously define at least one opening (not shown) that allows for gases to escape during a friction welding process. Additionally, the opening (s) may allow coolant, e.g., oil, to be circulated through the cooling gallery during operation.

The piston body 102 and cooling gallery ring 104 may be constructed from any materials that are convenient. In one exemplary illustration, the body 102 and cooling gallery ring 104 are formed of different materials. In another example, the body 102 and cooling gallery ring 104 are formed of the same material, e.g., steel. Accordingly, a material used for the components may be more closely matched with the general requirements and operating conditions relevant to each. Piston body 102 may, merely as examples, include different mechanical properties, e.g., yield point, tensile strength or notch toughness, than the cooling gallery ring 104. Any material or combination may be employed for the body 102 and cooling gallery ring 104 that is convenient. Merely as examples, the body 102 and/or cooling gallery ring 104 may be formed of a steel material, cast iron, aluminum material, composite, or powdered metal material. The body 102 and/or cooling gallery ring 104 may also be formed in a same forming process type, e.g., each may be formed in a high-speed forging or cold forming process. Alternatively, the cooling gallery ring 104 and body 102 may be formed in different processes, e.g., the body 102 may be a generally single cast piece, while the cooling gallery ring 104 may be forged. Any material and/or forming combination may be employed that is convenient.

Figure 6:
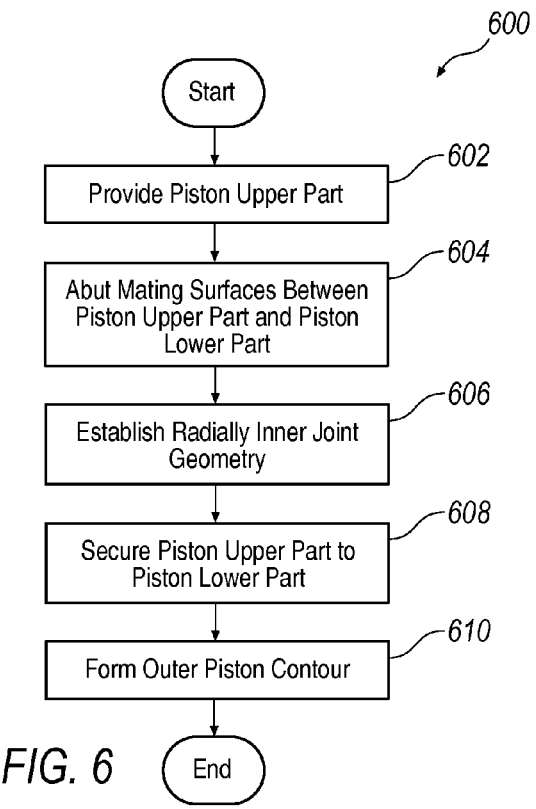
FIG. 6 is a process flow diagram for a method of making a pre-finished piston, according to an exemplary illustration.

Turning now to FIG. 6, an exemplary process 600 for making a pre-finished piston assembly 100' and/or piston assembly 100 is illustrated. Process 600 may generally begin at block 602, where a piston upper part is provided. For example, as described above a piston upper part 104' may include radially inner and outer mating surfaces 116, 114. Additionally, the piston upper part 104' may define at least in part a cooling gallery 108 extending about a periphery of the piston upper part 102', e.g., with upper cooling gallery surface 111. Process 600 may then proceed to block 604.

At block 604, inner and outer mating surfaces of the piston upper part may be abutted with corresponding inner and outer mating surfaces of a piston lower part. For example, as described above a radially inner interface region I may be formed between the inner mating surfaces 116, 120, and a radially outer interface region O may be formed between outer mating surfaces 114, 118 of the upper part 104' and lower part 102'. Moreover, a cooling gallery 108 may be disposed between the radially inner and outer interface regions I, O, and may be defined in part by a cooling gallery lower surface 113 defined by the piston lower part 102'. Additionally, the lower part 102' may include a pair of oppositely disposed pin bosses 105 defining respective piston pin bores 107. Process 600 may then proceed to block 606.

At block 606, a radially inner interface region geometry may be established. For example, as described above a radially inner mating surface 120 of the lower piston part 102' may extend radially inwardly from the radially inner interface region I and/or the joint between the radially inner mating surfaces 116, 120. In one exemplary illustration noted above, the radially inner mating surface 120 defines substantially a right angle with respect to radially inwardly facing surface 132 of the piston upper part 104' extending away from the radially inner interface region I and/or the joint between the mating surfaces 116, 120. Alternatively or in addition, surfaces of the cooling gallery defined by the lower part 102' may extend away from the joint, i.e., from the mating surface 120, in an angled fashion, thereby facilitating an increased volume of the cooling gallery 108, with at least a portion of the cooling gallery 108 extending radially inward of at least a portion of the combustion bowl 122 of the resulting piston 100. Moreover, a reduced overall height of the piston 100 and components thereof may also be achieved.

Proceeding to block 608, the upper and lower piston parts 104', 102' may be fixedly secured together along one or more of the radially inner and outer interface regions. For example, as described above the upper and lower piston parts 104', 102' may be fixedly secured together along the radially inner and/or outer mating surfaces of the crown and skirt by friction welding, adhesive bonding, or any other method that is convenient. In examples where friction welding is employed, welding flash may be formed adjacent the mating surfaces 114, 116, 118, 120, as illustrated above. In one exemplary illustration, a weld flashing extending radially inwardly from the radially inner mating surfaces 116, 120 may form a single weld curl 124 extending radially inwardly and axially upwardly. Process 600 may then proceed to block 610.

At block 610, an outer contour of the piston 100 may be formed. For example, as described above, the pre-finished piston assembly 100' may be machined to form the combustion bowl 122 and/or ring belt portion 106. Moreover, the machining of outer surfaces of the pre-finished piston assembly 100' may remove weld flashing disposed on outer surfaces of the pre-finished piston assembly 100'.

The resulting shallow bowl construction of the piston 100 may advantageously allow for smaller overall geometry of the piston 100. Compression height, overall height of the piston, and a height of the combustion bowl 122 with respect to top surface 160 may be reduced. Moreover, the smaller compression height reduces size and weight of the piston 100, allowing smaller engine blocks and smaller components overall, allowing greater freedom in vehicle packaging around the engine block. A longer connecting rod may also be employed where compression height is minimized, reducing lateral forces during engine operation against the engine bore, thereby reducing friction between the piston 100 and the bore, and improving engine efficiency.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A pre-finished assembly for making a piston, comprising:
    a lower part defining a longitudinal axis, the lower part having a skirt and forming a lower surface of a cooling gallery, the lower part having a radially inner bowl surface defining a lower part radially inner mating surface, the radially inner bowl surface extending from a radially innermost edge of the radially inner mating surface toward a center portion of the assembly, the lower part including a radially outer wall defining a radially outer mating surface; and
    an upper part having a radially outer bowl surface meeting the radially inner bowl surface at a radially inner joint, the upper part including a radially inner wall defining a lower surface extending radially to define an upper part radially inner mating surface, the radially inner wall defining a radially inwardly facing surface leading upwardly away from the upper part radially inner mating surface, the upper part including a radially outer wall defining an upper part radially outer mating surface;
    wherein the radially inwardly facing surface of the upper part defines a non-parallel angle with the radially inner bowl surface where the radially inner bowl surface meets a radially innermost edge of the radially inner mating surface of the upper part;
    wherein the upper part radially inner mating surface is defined by an upper part radially inner wall having a first radial width corresponding to the upper part radially inner mating surface and
    wherein the radially inner bowl surface of the lower part defines a second radial width greater than the first width.

2. The pre-finished assembly of claim 1, wherein the upper part radially inner mating surface is defined by an upper part radially inner wall having a first radial width corresponding to the upper part radially inner mating surface; and
    wherein the radially inner bowl surface of the lower part extends away radially inwardly from the upper part radially inner wall.

3. The pre-finished assembly of claim 1, wherein the radially inner mating surfaces are friction welded together.

4. The pre-finished assembly of claim 1, wherein the radially outer mating surface of the upper part are joined with the radially outer mating surface of the lower part such that the cooling gallery is substantially enclosed.

5. The pre-finished assembly of claim 1, wherein a cooling gallery surface defined by the lower piston part and extending from the radially inner mating surface of the lower piston part defines a first non-parallel angle with the piston axis.

6. The pre-finished assembly of claim 5, wherein the cooling gallery surface transitions from the first non-parallel angle to a second non-parallel angle at a position spaced axially below the radially inner mating surface of the lower piston part.

7. The pre-finished assembly of claim 6, wherein the second non-parallel angle is greater than the first non-parallel angle.

8. The pre-finished assembly of claim 7, wherein the first non-parallel angle is no greater than twenty (20) degrees, and the second non-parallel angle is no greater than forty-five (45 degrees.

9. The pre-finished assembly of claim 1, wherein the radially inner mating surface of the lower part defines a substantially right angle with respect to the piston axis.

10. The pre-finished assembly of claim 1, wherein the radially inner mating surface of the lower part defines a substantially right angle with respect to the radially inwardly facing surface of the piston upper part.

11. The pre-finished assembly of claim 1, wherein welded material generated from the two radially inner mating surfaces forms two weld curls extending radially outwardly from the radially inner mating surfaces.

12. The pre-finished assembly of claim 1, wherein the upper and lower parts are each formed of a steel material.

13. The pre-finished assembly of claim 1, wherein the upper and lower parts are each formed of a same material.

14. The pre-finished assembly of claim 1, wherein the radially inner mating surfaces are welded together such that welded material generated from the two radially inner mating surfaces forms only one weld curl extending radially inwardly from the radially inner mating surfaces.

15. A method of joining a pre-finished assembly, comprising:
    providing a lower part defining a longitudinal axis, the lower part having a skirt and forming a lower surface of a cooling gallery, the lower part having a radially inner bowl surface defining a lower part radially inner mating surface, the lower part including a radially outer wall defining a radially outer mating surface;
    abutting the lower part against an upper part, the upper part having a radially outer bowl surface meeting the radially inner bowl surface at a radially inner joint, the upper part including a radially inner wall defining a lower surface extending radially to define an upper part radially inner mating surface, the radially inner wall defining a radially inwardly facing surface leading upwardly away from the upper part radially inner mating surface, the upper part including a radially outer wall defining an upper part radially outer mating surface; and
    welding the radially inner mating surfaces together, wherein the radially inwardly facing surface of the upper part defines a non-parallel angle with the radially inner bowl surface where the radially inner bowl surface meets a radially innermost edge of the radially inner mating surface of the upper part;
    wherein welding the radially inner mating surfaces together includes generating welded material from the two radially inner mating surfaces to form only one weld curl extending radially inwardly from the radially inner mating surfaces.

16. The method of claim 15, wherein welding the radially inner mating surfaces together includes friction welding the radially inner mating surfaces.

17. The method of claim 15, further comprising establishing the radially inner bowl surface of the lower part as extending away radially inwardly from the upper part radially inner wall.

18. The method of claim 15, further comprising establishing a cooling gallery surface defined by the lower piston part as extending from the radially inner mating surface of the lower piston part to define a first non-parallel angle with the piston axis.

19. The method of claim 18, further comprising establishing the cooling gallery surface as transitioning from the first non-parallel angle to a second non-parallel angle at a position spaced axially below the radially inner mating surface of the lower piston part.

20. The method of claim 19, wherein the second non-parallel angle is greater than the first non-parallel angle.

21. The method of claim 15, further comprising establishing the radially inner mating surface of the lower part as defining a substantially right angle with respect to the piston axis.

22. The method of claim 15, further comprising machining the radially inner and outer bowl surfaces to define a piston combustion bowl surface, wherein the piston combustion bowl surface defines a maximum height from a top surface of the piston, and a ratio of the maximum height to a piston diameter is no greater than 15%.

23. A pre-finished assembly for making a piston, comprising:
    a lower part defining a longitudinal axis, the lower part having a skirt and forming a lower surface of a cooling gallery, the lower part having a radially inner bowl surface defining a lower part radially inner mating surface, the radially inner bowl surface extending from a radially innermost edge of the radially inner mating surface toward a center portion of the assembly, the lower part including a radially outer wall defining a radially outer mating surface; and
    an upper part having a radially outer bowl surface meeting the radially inner bowl surface at a radially inner joint, the upper part including a radially inner wall defining a lower surface extending radially to define an upper part radially inner mating surface, the radially inner wall defining a radially inwardly facing surface leading upwardly away from the upper part radially inner mating surface, the upper part including a radially outer wall defining an upper part radially outer mating surface;
    wherein the radially inwardly facing surface of the upper part defines a non-parallel angle with the radially inner bowl surface where the radially inner bowl surface meets a radially innermost edge of the radially inner mating surface of the upper part; and
    wherein the radially inner mating surfaces are welded together such that welded material generated from the two radially inner mating surfaces forms only one weld curl extending radially inwardly from the radially inner mating surfaces.

* * * * *